United States Patent Office 3,177,231
Patented Apr. 6, 1965

3,177,231
PROCESS FOR PREPARATION OF 16α,17α,21-TRIHYDROXY STEROIDS
Josef Fried, Princeton, N.J., assignor to Olin Mathieson Chemical Corporation, New York, N.Y., a corporation of Virginia
No Drawing. Filed Jan. 14, 1963, Ser. No. 251,070
9 Claims. (Cl. 260—397.45)

This application is a continuation-in-part of my application Serial No. 84,989, filed January 26, 1961, and now abandoned.

This invention relates to, and has for its object the provision of, a method of preparing physiologically active steroids and more particularly to preparing steroids of the 16α,17α,21-trihydroxy series.

In my Patent No. 3,048,581, granted August 7, 1962, I describe various 16,17-cyclic ketal and acetal derivatives of 16α,17α,21-trihydroxy steroids of the pregnane series. In addition to these 11-oxygenated derivatives, other 16,17-cyclic ketal and acetal derivatives of 16α,17α,21-trihydroxy steroids of the pregnane series, unsubstituted in the C-ring, are also known. It is often necessary to remove the ketal or acetal group in such steroids in order to prepare the free 16,17-dihydroxy steroid for use as such or for conversion into different ketal, acetal or other cyclic derivatives. Unfortunately, it has been found that normal procedures, such as refluxing with a dilute mineral acid, are ineffective to achieve the desired hydrolysis. The instant invention, therefore, relates to a process for hydrolyzing such cyclic ketals and acetals to the free 16,17,21-trihydroxy derivative.

It has been found that concentrated formic acid is unique amongst all acids tested in effecting the desired hydrolysis of a 16,17-cyclic ketal or acetal derivative of a 16,17,21-trihydroxy steroid (or a 21-ester thereof) to its corresponding free 16,17,21-trihydroxy derivative in high yield. Other acids, such as hydrochloric acid, are inoperative and fail to give the desired product, whereas dilute formic acid only partially hydrolyzes the starting material.

The process of the present invention, therefore, comprises treating a 16,17-cyclic ketal or acetal of a 16α,17α,21-trihydroxy steroid of the pregnane series (or a 21-ester thereof) with concentrated formic acid. The cleavage of the acetal or ketal group is followed by formylation in the 16 position (and other positions containing an active free hydroxyl group, such as a 21-hydroxyl group). The resulting formates can then be hydrolyzed in the normal manner under mild conditions to yield the desired free hydroxy steroid product.

Although the process of this invention is applicable to any 16,17-cyclic ketal or acetal derivative of a 16α,17α,21-trihydroxy steroid of the pregnane series (including 2-esters thereof), particularly preferred are steroids of the general formula

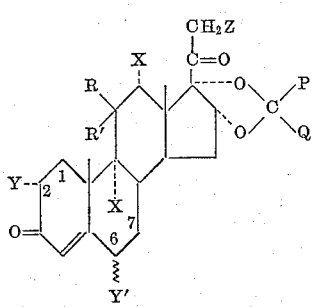

wherein the 1,2 and 6,7-positions are saturated or double-bonded; R is hydrogen, R' is hydrogen, hydroxy or α-acyloxy, or together R and R' is keto; each X is hydrogen, halogen, hydroxy, lower alkoxy or lower alkyl, at least one X being hydrogen; Y is hydrogen or methyl; Y' is hydrogen, halogen, or methyl in either the alpha or beta position; hydroxy or acyloxy; P is lower alkyl, halo lower alkyl, carboxy lower alkyl (or a salt or ester theerof), monocyclic cycloalkyl, monocyclic aryl, monocyclic aryl lower alkyl, monocyclic heterocyclic or monocyclic heterocyclic lower alkyl; Q is hydrogen or one of the radicals defined by P; or together with the carbon to which they are joined P and Q are cycloalkyl or monocyclic heterocyclic.

Among the suitable starting steroids utilizable in the process of this invention may be mentioned the 16,17-cyclic acetals and ketals of:

16α-hydroxyhydrocortisone,
16α-hydroxycortisone,
16α-hydroxyprednisolone,
16α-hydroxyprednisone,
9α-halo-16α-hydroxyhydrocortisones (i.e.,
9α-fluoro-16α-hydroxyhydrocortisone,
9α-chloro-16α-hydroxyhydrocortisone,
9α-bromo-16α-hydroxyhydrocortisone and
9α-iodo-16α-hydroxyhydrocortisone),
9α-halo-16α-hydroxycortisones,
9α-halo-16α-hydroxyprednisolone (e.g., triamcinolone),
9α-halo-16α-hydroxyprednisones,
12α-halo-16α-hydroxyhydrocortisones (e.g.,
12α-fluoro-16α-hydroxyhydrocortisone),
12α-halo-16α-hydroxycortisones (e.g.,
12α-chloro-16α-hydroxycortisone),
12α-halo-16α-hydroxyprednisolones (e.g.,
12α-fluoro-16α-hydroxyprednioslone),
12α-halo-16α-hydroxyprednisones,
6α-methyl-16α-hydroxyhydrocortisone,
6α-methyl-16α-hydroxycortisone,
6α-methyl-16α-hydroxyprednisolone,
6α-methyl-16α-hydroxyprednisone,
2α-methyl-16α-hydroxyhydrocortisone,
2α-methyl-16α-hydroxycortisone,
2-methyl-16α-hydroxyprednisolone,
2-methyl-16α-hydroxyprednisone,
2α,6α-dimethyl-16α-hydroxyhydrocortisone,
2α,6α-dimethyl-16α-hydroxycortisone,
9α-halo-2-methyl-16α-hydroxy prednisolones (e.g., 2-methyltriamcinolone),
9α-halo-6α-methyl-16α-hydroxyhydrocortisones (e.g.,
9α-fluoro-6α-methyl-16α-hydroxyhydrocortisone),
9α-halo-6α-metyl-16α-hydroxy-prednisolones (e.g.,
6α-methyl triamcinolone),
16α-hydroxy-6-dehydrocortisone,
16α-hydroxy-6-dehydrohydrocortisone,
16α-hydroxy-6-dehydroprednisolone,
9α-halo-16α-hydroxy-6-dehydroprednisolones,
16α-hydroxy-9α-(lower alkyl)hydrocortisones (e.g.,
16α-hydroxy-9α-methylhydrocortisone),
16α-hydroxy-9α-(lower alkyl)cortisones (e.g.,
16α-hydroxy-9α-methylcortisone),
16α-hydroxy-9α-(lower alkyl)prednisolones (e.g.,
16α-hydroxy-9α-methylprednisolone),
16α-hydroxy-9α-(lower alkyl)prednisones,
9α-(lower alkyl)-Δ⁴-pregnene-11α,16α,17α,21-tetrol-3,20-diones (e.g.,
9α-methyl-Δ⁴-pregnene-11α,16α,17α,21-tetrol-3,20-dione),
9α-(lower alkyl)-Δ¹,⁴-pregnadiene-11α,16α,17α,21-tetrol-3,20-diones, and 11α-esters thereof, particularly esters with hydrocarbon carboxylic acids having less than ten carbon atoms, 6-halo-16α-hydroxyhydrocortisones (e.g.,
6α-fluoro-16α-hydroxyhydrocortisone,
6β-fluoro-16α-hydroxyhydrocortisone and
6α-chloro-16α-hydroxyhydrocortisone),
6-halo-16α-hydroxyprednisolones (e.g.,
6α-fluoro-16α-hydroxyprednisolone,
6β-fluoro-16α-hydroxyprednisolone and
6α-chloro-16α-hydroxyprednisolone),
6-halo-16α-hydroxycortisones,
6-halo-16α-hydroxyprednisones,
6,9-dihalo-16α-hydroxyhydrocortisones (e.g.,
6α,9α-difluoro-16α-hydroxyhydrocortisone,
6β,9α-difluoro-16α-hydroxyhydrocortisone,
6α-chloro-9α-fluoro-16α-hydroxyhydrocortisone and
6β,9α-dichloro-16α-hydroxyhydrocortisone),
6,9α-dihalo-16α-hydroxycortisones,
6,9α-dihalo-16α-hydroxyprednisolones (e.g.,
6α-fluorotriamcinolone,
6β-fluorotriamcinolone,
6α-chlorotriamcinolone,
6β-chlorotriamcinolone,
6α,9α-dichloro-16α-hydroxyhydrocortisone, and
6β,9α-dichloro-16α-hydroxyhydrocortisone),
6,9α-dihalo-16α-hydroxyprednisones,
6,12α-dihalo-16α-hydroxyhydrocortisones,
6,12α-dihalo-16α-hydroxycortisones,
6,12α-dihalo-16α-hydroxyprednisolones,
6,12α-dihalo-16α-hydroxyprednisones,
2α-methyl-6-halo-16α-hydroxyhydrocortisones,
2α-methyl-6-halo-16α-hydroxycortisones,
2α-methyl-6-halo-16α-hydroxyprednisolones,
2α-methyl-6-halo-16α-hydroxyprednisones,
2α-methyl-6,9α-dihalo-16α-hydroxyhydrocortisones (e.g.,
2α-methyl-6α-fluorotriamcinolone and
2α-methyl-6β-fluorotriamcinolone),
6-halo-16α-hydroxy-6-dehydrocortisones,
6-halo-16α-hydroxy-6-dehydrohydrocortisones,
6-halo-16α-hydroxy-6-dehydroprednisolones,
6,9α-dihalo-16α-hydroxy-6-dehydroprednisolones,
6-halo-9α-(lower alkyl)-16α-hydroxyhydrocortisones (e.g.,
6α-fluoro-9α-methyl-16α-hydroxyhydrocortisone),
6-halo-9α-(lower alkyl)-16α-hydroxycortisones,
6-halo-9α-(lower alkyl)-16α-hydroxyprednisolones,
6-halo-9α-(lower alkyl)-16α-hydroxyprednisones,
16α,17α,21-trihydroxyprogesterone,
16α,17α,21-trihydroxy-1-dehydroprogesterone,
16α,17α,21-trihydroxy-6-dehydroprogesterone,
6-halo-16α,17α,21-trihydroxyprogesterones (e.g.,
6α-fluoro-16α,17α,21-trihydroxyprogesterone and
6α-chloro-16α,17α,21-trihydroxyprogesterone),
6-halo-16α,17α,21-trihydroxy-1-dehydroprogesterones,
6-halo-16α,17α,21-trihydroxy-6-dehydroprogesterones, and 21-esters of any of the above compounds, preferably esters with hydrocarbon carboxylic acids having less than ten carbon atoms, as exemplified by a lower alkanoic acid (e.g., acetic, propionic and tert-pentanoic acid), a monocyclic aryl carboxylic acid (e.g., benzoic and toluic acid), a monocyclic aryl lower alkanoic acid (e.g., phenacetic and β-phenylpropionic acid), a lower alkenoic acid, a cycloalkane carboxylic acid and a cycloalkene carboxylic acid.

Among the suitable aldehydes and ketones used in the preparation of the starting materials of this invention may be mentioned lower alkanals, such as acetaldehyde, propanal and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclodexanone; mono and dicycloalkyl ketones, such as cyclohexylmethylketone and dicyclopropylketone, halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)benzaldehydes (e.g., veratraldehyde), hydroxybenzaldehydes (e.g., salicylaldehydes), dihydroxybenzaldehydes (e.g., resorcyaldehyde), lower alkyl benzaldehyde (e.g., m-tolualdehyde and p-ethylbenzaldehyde), di(lower alkyl)benzaldehydes (e.g., o,p-dimethylbenzaldehyde), nitrobenzaldehydes, acylamidobenzaldehydes (e.g., N-acetylanthranilaldehyde), and cyanobenzaldehydes; monocyclic carbocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic carbocyclic aromatic ketones, such as acetophenone, α,α,α-trifluoroacetophenone, propiophenone, butyrophenone, valerophenone, isocaprophenone, halophenyl lower alkyl ketones (e.g., p-chloroacetophenone and p-chloropropiophenone), (lower alkoxy)phenyl lower alkyl ketones (e.g., p-anisyl methyl ketone), di(lower alkoxy)phenyl lower alkyl ketones, hydroxyphenyl lower alkyl ketones, dihydroxyphenyl lower alkyl ketones (e.g., resacetophenone), (lower alkyl)phenyl lower alkyl ketones (e.g., methyl p-tolyl ketone), di(lower alkyl)phenyl lower alkyl ketones (o,p-xylyl methyl ketone), nitrophenyl lower alkyl ketones (e.g., p-nitroacetophenone), acylamidophenyl lower alkyl ketones (e.g., acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxane; monocyclic heterocyclic lower alkanones; and oxo lower alkanoic acids such as glyoxylic, pyruvic, acetoacetic, β-ketopropionic, α-ketobutyric, levulinic, β-ketocaproic and β-ketocaprylic acid [as well as salts and esters thereof, such as the lower alkyl esters (e.g., methyl and ethyl)].

In accordance with the process of this invention, such acetals and ketals are treated with concentrated formic acid. By concentrated formic acid is meant aqueous formic acid, that is, an aqueous solution of formic acid containing more than about 80% formic acid, optimally greater than 90% formic acid. The process results in not only the cleavage of the acetal or ketal group, but also in esterification of the resulting free 16α-hydroxy group to a formate derivative. Any other labile hydroxy group, such as a free 21-hydroxy group, present in the steroid molecule is also converted to a formate derivative. In order to increase the rate of reaction, the process is preferably conducted at an elevated temperature, optimally a temperature in the range of about 40° C. to about 100° C.

The formic acid ester initially formed may then be saponified by treatment with a weak base, such as a dilute alkali (e.g., dilute sodium hydroxide and dilute potassium hydroxide) or a salt of a strong base and a weak acid (e.g., an alkali metal carbonate or bicarbonate, such as potassium carbonate), the reaction preferably being carried out in an inert atmosphere, such as under nitrogen. This saponification step will not only convert any formate groups to free hydroxy derivatives but in addition, of course, will hydrolyze any other ester groupings present, such as 21-esters to their corresponding free hydroxyl (e.g., 21-hydroxy) derivatives.

The following examples illustrate the process of this invention (all temperatures being in degrees centigrade):

EXAMPLE 1

*Triamcinolone from triamcinolone 16,17-acetonide 21-acetate*

A solution of 200 mg. of triamcinolone 16,17-acetonide 21-acetate in 6 ml. of 90% formic acid is allowed to remain at 42° for sixteen hours. The solvent is then removed in vacuo to furnish a residue of triamcinolone 16,21-diformate. The residue is dissolved in 20 ml. of methanol and hydrolyzed under nitrogen with 4 ml. of a 10% aqueous oxygen-free potassium carbonate solution for 30 minutes. The mixture is neutralized with 0.4 ml. of glacial acetic acid, diluted with water and concentrated in vacuo until crystals appear. Filtration furnishes about 110 mg. of pure triamcinolone, identical with an authentic sample.

EXAMPLE 2

A solution of 200 mg. of triamcinolone 16,17-acetonide in 6 ml. of 88% formic acid is placed in an oven maintained at 40–42° for a period of seventeen hours. The mixture is then concentrated to dryness in vacuo to give a residue of triamcinolone 16,21-diformate. The residue is dissolved in 20 ml. of methanol and hydrolyzed under nitrogen with 4 ml. of 10% oxygen-free aqueous potassium carbonate solution for 30 minutes at room temperature. The mixture is neutralized with 0.4 ml. of glacial acetic acid, diluted with water and freed from methanol in vacuo. The resulting suspension is extracted with methylisobutyl ketone and the methylisobutyl ketone extract is dried over sodium sulfate and evaporated to dryness in vacuo. The residue is recrystallized from ethanol to give pure triamcinolone.

EXAMPLE 3

*6α fluoro - 16α,17α,21 - trihydroxyprogesterone from 6α - fluoro - 16α,17α,21 - trihydroxyprogesterone 16,17-acetonide*

Following the procedure of Example 1, but substituting 200 mg. of 6α-fluoro-16α,17α,21-trihydroxyprogesterone 16,17-acetonide for the triamcinolone 16,17-acetonide 21-acetate, 6α-fluoro-16α,17α,21-trihydroxyprogesterone is obtained.

EXAMPLE 4

*6α,9α - difluoro - 16α - hydroxyhydrocortisone from 6α, 9α - difluoro - 16α - hydroxyhydrocortisone 16,17-acetonide 21-acetate.*

Following the procedure of Example 1 but substituting 200 mg. of 6α,9α-difluoro-16α-hydroxyhydrocortisone 16,17-acetonide 21-acetate for the triamcinolone 16,17-acetonide 21-acetate, 6α,9α-difluoro-16α-hydroxyhydrocortisone is obtained.

EXAMPLE 5

*6α,9α - difluoro - 16α - hydroxyprednisolone from 6α,9α-difluoro - 16α - hydroxyprednisolone 16,17 - acetonide 21-acetate*

Following the procedure of Example 1, but substituting 200 mg. of 6α,9α-difluoro-16α-hydroxyprednisolone 16,17-acetonide 21-acetate for the triamcinolone 16,17-acetonide 21-acetate, 6α,9α-difluoro-16α-hydroxyprednisolone is obtained.

EXAMPLE 6

*Triamcinolone from triamcinolone 16,17-acetophenonide*

Following the procedure of Example 1, but substituting 200 mg. of triamcinolone 16,17-acetophenonide for the triamcinolone 16,17-acetonide 21-acetate, the same product, triamcinolone, is obtained.

EXAMPLE 7

*6α-fluoro-16α-hydroxyprednisolone from 6α-fluoro-16α-hydroxy-prednisolone 16,17-acetonide 21-acetate*

Following the procedure of Example 1, but substituting 200 mg. of 6α-fluoro-16α-hydroxyprednisolone 16,17-acetonide 21-acetate for the triamcinolone 16,17-acetonide 21-acetate, 6α-fluoro-16α-hydroxyprednisolone is obtained.

EXAMPLE 8

*6α-fluoro-16α-hydroxyhydrocortisone from 6α-fluoro-16α-hydroxyhydrocortisone 16,17-acetonide 21-acetate*

Following the procedure of Example 1, but substituting 200 mg. of 6α-fluoro-16α-hydroxyhydrocortisone 16,17-acetonide 21-acetate for the triamcinolone 16,17-acetonide 21-acetate, 6α-fluoro-16α-hydroxyhydrocortisone is obtained.

EXAMPLE 9

*12α-fluoro-16α-hydroxyhydrocortisone from 12α-fluoro-16α-hydroxyhydrocortisone 16,17-acetonide 21-acetate*

Following the procedure of Example 1, but substituting 200 mg. of 12α-fluoro-16α-hydroxyhydrocortisone 16,17-acetonide 21-acetate for the triamcinolone 16,17-acetonide 21-acetate, 12α-fluoro 16α-hydroxyhydrocortisone is obtained.

EXAMPLE 10

*12α-fluoro-16α-hydroxyprednisolone from 12α-fluoro-16α-hydroxyprednisolone 16,17-acetonide 21-acetate*

Following the procedure of Example 1, but substituting 200 mg. of 12α-fluoro-16α-hydroxyprednisolone 16,17-acetonide 21-acetate for the triamcinolone 16,17-acetonide 21-acetate, 12α-fluoro-16α-hydroxyprednisolone is obtained.

EXAMPLE 11

*6α-fluorotriamcinolone from 6α-fluorotriamcinolone 16,17-acetonide 21-acetate*

A solution of 1.5 g. of 6α-fluorotriamcinolone 16,17-acetonide 21-acetate in 45 ml. of 90% formic acid is allowed to stand in an oven heated at 42° for sixteen hours. After removal of the solvents in vacuo the dry residue of 6α-fluorotriamcinolone 16,21-diformate is taken up in 150 ml. of methanol and treated with stirring under nitrogen with a solution of 30 ml. of 10% oxygen-free potassium carbonate in water. After 30 minutes the mixture is neutralized with 3 ml. of glacial acetic acid, diluted with water and the methanol removed in vacuo. Crystallization ensues and the resulting crystalline precipitate is removed by filtration. Recrystallization of the dried crystals from methanol furnishes pure 6α-fluorotriamcinolone, M.P. about 269—270° (dec.), identical with an authentic sample by infrared comparison.

The following two examples illustrate the differences in result obtained with concentrated and dilute formic acid, respectively, and the superiority of the former.

EXAMPLE 12

A solution of 357 mg. of triamcinolone acetonide in 10 ml. of 60% formic acid (prepared by diluting 68 ml. of 88% formic acid to 100 ml.) is heated on the steam cone at 100° for 30 minutes. A very small amount of undissolved material is filtered amounting to less than 1 mg. To the warm filtrate, water is added to turbidity and the crystals (long needles and fine rosettes) are filtered off after one-half hour in the refrigerator. The crystals are washed with water and dried in vacuo: wt. 114 mg., M.P. 273–282°. These crystals are designated C–1. Chilling of the mother liquor produces an additional 74 mg. of crystals which melt at 222–244° and are designated C–2.

Thin layer chromatography of C–1 reveals that the bulk of this material is unchanged triamcinolone acetonide. This is corroborated by quantitative paper chromatography which shows that C–1 contained 11% triamcinolone, 63% triamcinolone acetonide, and 30% of two faster moving spots consisting probably of triamcinolone 16,21-diformate and triamcinolone acetonide 21-formate respectively; C-2 consisted of 70% of triamcinolone, 16% triamcinolone acetonide, and 14% triamcinolone diformate.

When a portion of C-1 (50 mg.) is hydrolyzed with 10% potassium carbonate in methanol, crystallization of the resulting material yields pure triamcinolone acetonide.

EXAMPLE 13

A solution of 357 mg. of triamcinolone acetonide in 1° ml. of 88% formic acid is heated on the steam cone at 100° for 30 minutes. After the removal of the reagent in vacuo followed by thorough drying for 1 hour at room temperature in vacuo, the residue is dissolved in 35 ml. of methanol and under a blanket of nitrogen, 7 ml. of 10% oxygen-free carbonate is added, the reaction mixture stirred for 1 hour under nitrogen and acidified with 0.8 ml. of glacial acetic acid. After the addition of water, the solution is concentrated in vacuo until crystallization occurs. Upon standing in the refrigerator, 162 mg. of material melting at 267–270° called C-1 is obtained. This material is analyzed by quantitative paper chromatography and is shown to consist of 98.5% pure triamcinolone, the remaining 1.5% being unchanged triamcinolone acetonide.

This invention may be variously otherwise embodied within the scope of the appended claims.

What is claimed is:

1. A process for preparing a 16α,17α,21-trihydroxy steroid of the pregnane series which comprises treating a compound selected from the group consisting of 16,17-cyclic ketals and acetals of 16α,17α,21-trihydroxy steroids of the pregnane series and 21-esters thereof with an aqueous solution of formic acid containing more than about 80% formic acid, hydrolyzing the formic acid ester formed, and recovering the 16α, 17α,21-trihydroxy steroid formed.

2. The process of claim 1 wherein the steroid is of the general formula

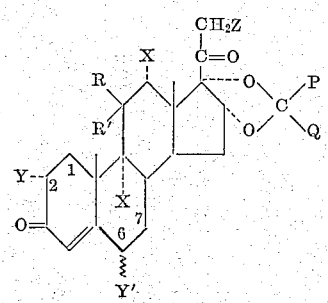

wherein the 1,2- and 6,7-positions are saturated or double-bonded, R is hydrogen, R' is selected from the group consisting of hydrogen, hydroxy, and α-acyloxy, and together R and R' is keto; each X is selected from the group consisting of hydrogen, halogen, hydroxy, lower alkoxy and lower alkyl, at least one X being selected from the group consisting of hydrogen and methyl; Y is selected from the group consisting of hydrogen and methyl; Y' is selected from the group consisting of hydrogen, halogen and methyl; Z is selected from the group consisting of hydroxy and acyloxy; P is selected from the group consisting of lower alkyl, halo-lower alkyl, carboxy-lower alkyl, monocyclic cycloalkyl, monocyclic aryl, monocyclic aryl lower alkyl, monocyclic heterocyclic and monocyclic heterocyclic lower alkyl; Q is selected from the group consisting of hydrogen, lower alkyl, halo-lower alkyl, carboxy-lower alkyl, monocyclic cycloalkyl, monocyclic aryl, monocyclic aryl lower alkyl, monocyclic heterocyclic and monocyclic heterocyclic lower alkyl; and together with the carbon to which they are joined P and Q are selected from the group consisting of cycloalkyl and monocyclic heterocyclic.

3. The process of claim 1 wherein the steroid is triamcinolone 16,17-acetonide.

4. The process of claim 1 wherein the steroid is triamcinolone 16,17-acetonide 21-(lower alkanoate).

5. The process of claim 1 wherein the steroid is triamcinolone 16,17-acetonide 21-acetate.

6. The process of claim 1 wherein the steroid is 6α-fluoro-triamcinolone 16,17-acetonide 21-(lower alkanoate).

7. The process of claim 1 wherein the steroid is 6α-fluoro-triamcinolone 16,17-acetonide 21-acetate.

8. The process of claim 1 wherein the steroid is 6α-fluoro-16α-hydroxyprednisolone 16,17-acetonide 21-(lower alkanoate).

9. The process of claim 1 wherein the steroid is 12α-fluoro-16α-hydroxyprednisolone 16,17-acetonide 21-(lower alkanoate).

References Cited by the Examiner
UNITED STATES PATENTS 3,021,347  2/62  Allen et al. _____ 260—297.45
3,050,519  8/62  Fried _____ 260—239.55

OTHER REFERENCES

Mills et al.: J.A.C.S. 81, pp. 1264–65 (1959).

LEWIS GOTTS, *Primary Examiner.*